(12) United States Patent
Dai et al.

(10) Patent No.: US 9,501,812 B2
(45) Date of Patent: Nov. 22, 2016

(54) MAP PERFORMANCE BY DYNAMICALLY REDUCING MAP DETAIL

(71) Applicant: Oracle International Corporation, Redwood Shores, CA (US)

(72) Inventors: Yi Dai, Winchester, MA (US); Hugh Zhang, Winchester, MA (US); Jairam Ramanathan, Waltham, MA (US); Prashant Singh, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 509 days.

(21) Appl. No.: 14/033,355

(22) Filed: Sep. 20, 2013

(65) Prior Publication Data
US 2015/0084961 A1  Mar. 26, 2015

(51) Int. Cl.
*G06T 3/40* (2006.01)
(52) U.S. Cl.
CPC .................. *G06T 3/4092* (2013.01)

(58) Field of Classification Search
None
See application file for complete search history.

(56) References Cited

U.S. PATENT DOCUMENTS

2010/0322527 A1\* 12/2010 Fablet ................. G06F 17/2252
382/232
2014/0118384 A1\* 5/2014 Buckley ............... G09G 3/3413
345/589

OTHER PUBLICATIONS

Dailey, David; "An SVG Primer for Today's Browsers"; W3C Working Draft, Slippery Rock University; Sep. 2010 147 pages.

\* cited by examiner

*Primary Examiner* — Michelle Chin
(74) *Attorney, Agent, or Firm* — Trellis IP Law Group, PC

(57) ABSTRACT

Example embodiments dynamically generate lower resolution maps from high precision vector for use on desktops. Lower resolution maps are dynamically generated on the client side by decreasing coordinate and path precision.

20 Claims, 6 Drawing Sheets

MAP PERFORMANCE BY DYNAMICALLY REDUCING MAP DETAIL

BACKGROUND

The present application relates to vector based software rendering applications and more specifically to reducing path complexity and precision in vector-based data visualization maps.

To support high resolution on a desktop computer or workstation data visualization maps often contain high precision path and coordinate data.

In vector based imaging programs, such as the Scalar Vector Graphics (SVG) standard promulgated by the World Wide Web Consortium, simple graphic elements are defined by tags in an Extensible Markup Language (XML) document. Complex graphic images can be composed using the basic graphic elements. The appearance and location of a particular graphic element are controlled by assigning values to the attributes of the graphic element.

Rendering of an SVG image occurs in a rectangular region called the SVG viewport. The height and width of the SVG viewport are specified by numbers of pixels. Another number may also be provided that specifies the size of a pixel in, for example, millimeters.

The SVG path is the basic drawing primitive of SVG that is used to draw lines, shapes circles, curves and arcs. A path primitive for a group drawing line segments includes a move command that specifies the pixel coordinates where the group of line segments and line commands specifying the endpoint of a line segment to be drawn.

The pixel positions in a path primitive may be specified in absolute or relative coordinates. When using absolute coordinates each pixel position is specified by the displacement from a fixed point in the viewport. When using relative coordinates each pixel position is specified by a displacement from the last drawing point.

In the SVG language move commands referring to absolute coordinates are indicated with a capital letter (M) and those that refer to relative coordinates are indicated by a small letter (m). Relative line commands may be indicated by an "l" and vertical or horizontal line to commands are indicated by "v" or "h" respectively. An absolute close path command is indicated by a "Z" and a relative close path command A path includes a list of commands. The pseudo-code includes a switch statement having cases for "M", "m", "l", "h" and "v" commands.

SUMMARY

In an example embodiment, complex vector data from a base map is simplified dynamically on a client device having a low resolution viewport thereby allowing a high resolution vector base map to be used on a less powerful device that is not able to render the map in the original resolution.

In another example embodiment, a high precision vector graphics command is dynamically reduced to create a corresponding simplified vector graphics command by calculating a scale factor indicating a minimum number of pixels of a high precision vector data image that can be resolved on a low resolution view port, parsing a path command to locate a first set of relative pixel coordinates in a first high precision vector graphics command, comparing the absolute values of each relative pixel coordinate in the set of relative pixel coordinates to the scale factor to determine whether the absolute value is greater than the scale factor and reducing the absolute value of a relative pixel coordinate only if the absolute value is greater than the scale factor to create the simplified vector graphics command.

The simplified vector graphics commands are faster to load on a mobile device having a low resolution viewport and make the interactive experience, such as zooming in or out, with the image smoother and more pleasant for the user.

A further understanding of the nature and the advantages of particular embodiments disclosed herein may be realized by reference of the remaining portions of the specification and the attached drawings.

DETAILED DESCRIPTION OF EMBODIMENTS

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, various embodiments may be practiced without some or all of these specific details. In other instances, well known process operations have not been described in detail in order not to unnecessarily obscure the present invention. Further, each appearance of the phrase an "example embodiment" at various places in the specification does not necessarily refer to the same example embodiment. Although the description has been described with respect to particular embodiments thereof, these particular embodiments are merely illustrative, and not restrictive.

Various embodiments will be described that dynamically reduce precision of vector based maps on the client allowing serving of one high resolution vector based map that can be simplified across client rendering platforms thereby reducing client workload for panning and zooming interactivity.

Current data visualization maps do not provide client side coordinate or path command manipulation to reduce path complexity and precision. Generally, an uploaded map visualization includes high resolution vector graphic data to ensure that a high resolution image can be rendered on any device. Many portable devices, such as smartphones, having small, low resolution screens will not be able to render many of the details of the high resolution map visualization but are still required to process the high resolution vector graphic data during user interaction such as zooming thereby degrading user experience.

Client rendered data visualization maps that rely on vector data to draw their base maps will often contain high precision coordinates to ensure high resolution map data. Such high resolution map data when rendered in a high resolution viewport will depict very fine map features such as the indentions in the coastline of *Florida*. However, when the same high resolution data is rendered in a low resolution viewport the details will not be visible. The reason for the lack visibility is that the size of the detail is less that the size of a pixel in the low resolution viewport and therefore is not visible.

Figure 1:
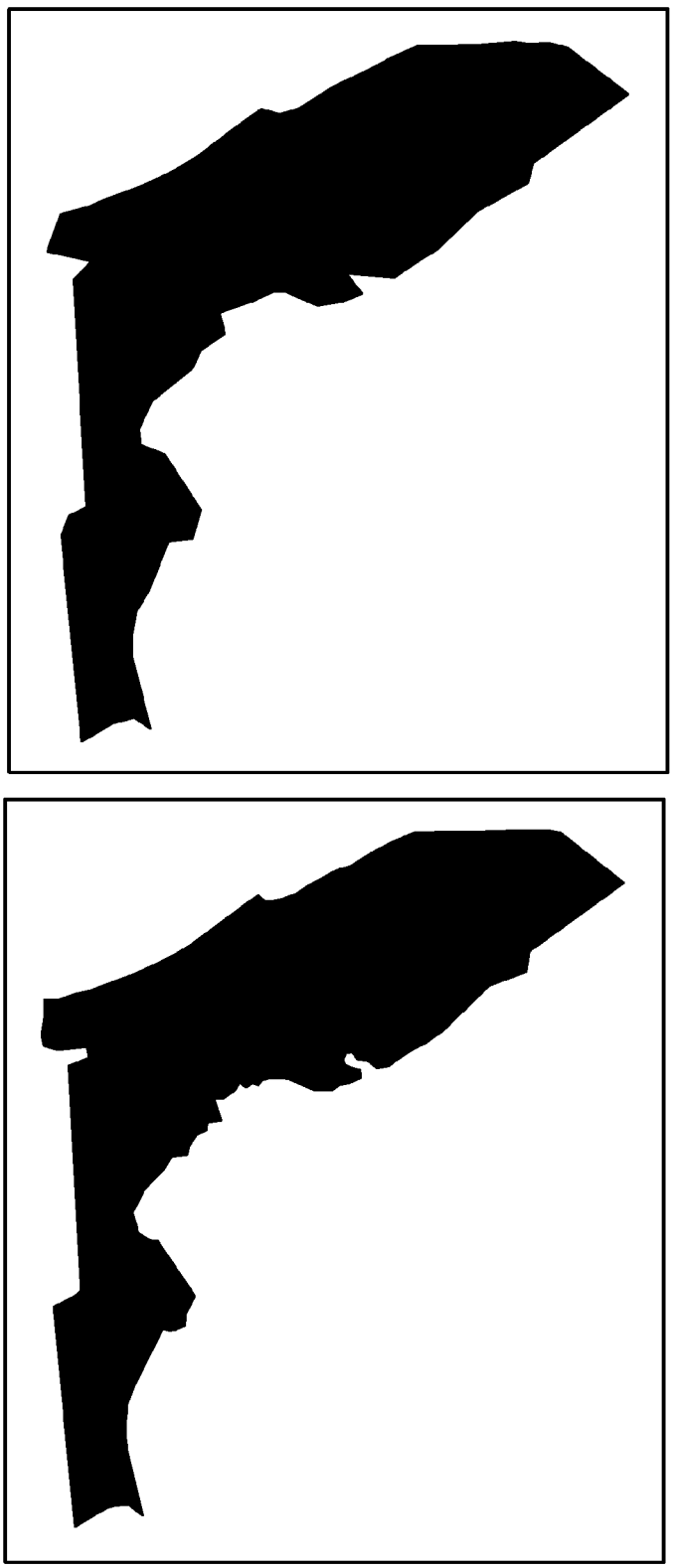
FIG. 1 illustrates the loss of resolution from a high resolution viewport to a low resolution display device.

FIG. 1 depict the loss of resolution from a highest resolution viewport to a low resolution display device. The details of the coast of Florida disappear in the image rendered on the low resolution viewport.

The entire image is displayed in each viewport. In this case the lower resolution viewports have smaller pixel sizes so that details rendered in many pixels in left side of FIG. 1 are rendered in fewer pixels in the viewport of the right resulting in loss of resolution.

Figure 2:
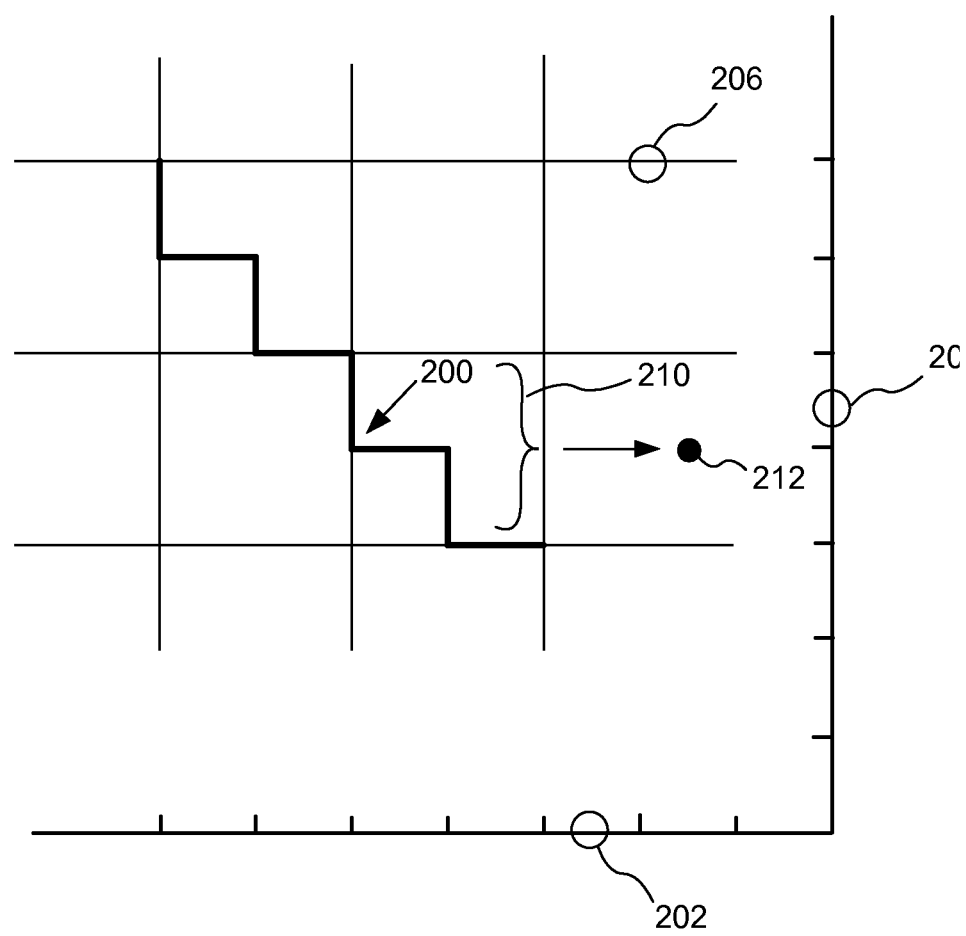
FIG. 2 illustrates a small portion of a high resolution map rendered on a viewport of different pixel dimensions.

FIG. 2 depicts a small portion of a high resolution map rendered on a viewport of different pixel dimensions.

In FIG. 2 a high resolution zigzagging line 200 is depicted on a small 7×7 pixel subsection of high resolution 1000× 1000 pixel vector based map. The pixel coordinates of the high resolution map are indicated by high resolution grid axes 202 and 204. The distance between each tick mark on the high resolution grid axes 202 and 204 indicates one pixel of the high resolution map.

A grid 206 represents the pixel size of a low resolution 500×500 pixel viewport. As indicated in FIG. 2A, the zigzag portion 210 of high resolution line would be rendered as a single pixel or dot 212 on the low resolution viewport.

In one example embodiment, a scale factor is calculated that is used to reduce the precision of vector graphic primitives when rendering to low resolution viewports. The first step in calculating a scale factor is to determine ratios of the pixel widths and heights of the high resolution map and the low resolution viewport and then set the scale factor equal to the inverse of the ratio having the minimum value.

For example, in comparing the viewports described above with reference to FIG. 2, the ratio is 500/1000 which is equal to 0.5 and the scale factor is equal to 2. Any number of pixels in the high resolution map less that the scale factor will be rendered as a single pixel on the low resolution viewport. Four line segments of the zigzag line 200 are rendered as a single pixel 212 in the low resolution viewport.

Accordingly, as depicted in FIG. 2, none of the zigzags of line 200 are rendered in the low resolution viewport. Only line segments resulting from moves greater than 2 pixels are depicted in the low resolution viewport.

In an example embodiment, a zoom factor is also included in the scale factor. The zoom factor is the amount the user is allowed to zoom into the map from the initial viewport dimensions. When the zoom factor is positive, i.e., where a small portion of an image is enlarged to fill the entire viewport, the scale factor will decrease because rendering a smaller part of the image allows an increase the resolution when the image is rendered.

A scale factor that takes into account the relative size of the image map and the viewport and also takes into account the zoom factor is given by equation 1:

$$\text{scale factor} = 1/(\min(\text{viewportDimension}/\text{mapDimension})*\text{zoomfactor}) \quad \text{Eq. 1}$$

In an example embodiment, an algorithm processes graphics primitives to convert high resolution drawing commands that specify pixel displacement values less than the scale factor value into simplified drawing commands.

Referring again to FIG. 2, the line resolution of line 200 can be represented by a high resolution path primitive equal to 'M' 3 3 'l' 0 1 1 0 0 1 1 0 0 1 1 0 0 1 1 0, where "M" is a move command to move the drawing point to the coordinates following the command and "l" is a line command to draw a line to the drawing point specified by the coordinates following the command. The high resolution path primitive starts the drawing point at x=3, y=3 and the moves the drawing point one pixel up, one pixel right, one pixel up, one pixel right, one pixel up, one pixel right, one pixel up, one pixel right, one pixel up, one pixel right, one pixel up, one pixel right, one pixel up, one pixel right, one pixel up, one pixel right. The drawing point finishes at x=7, y=7.

The single pixel displacements of the high resolution will not be displayed in the low resolution viewport because the scale factor is equal to 2. However, it is still necessary to represent the line 200 without the zigzags on the low resolution viewport.

In this case the example algorithm accumulates non-resolvable displacement values less that the scale factor and replaces a sum of non-resolvable displacement values by resolvable displacement value greater than the scale factor. Accordingly, the 'M' 3 3 'l' 0 1 1 0 0 1 1 0 0 1 1 0 0 1 1 0 high resolution path primitive is converted to a simplified primitive equal to 'M' 3 3 "l" 2 3. The zigzag line of the high resolution map is rendered as a straight line on the low resolution viewport.

Figure 3:
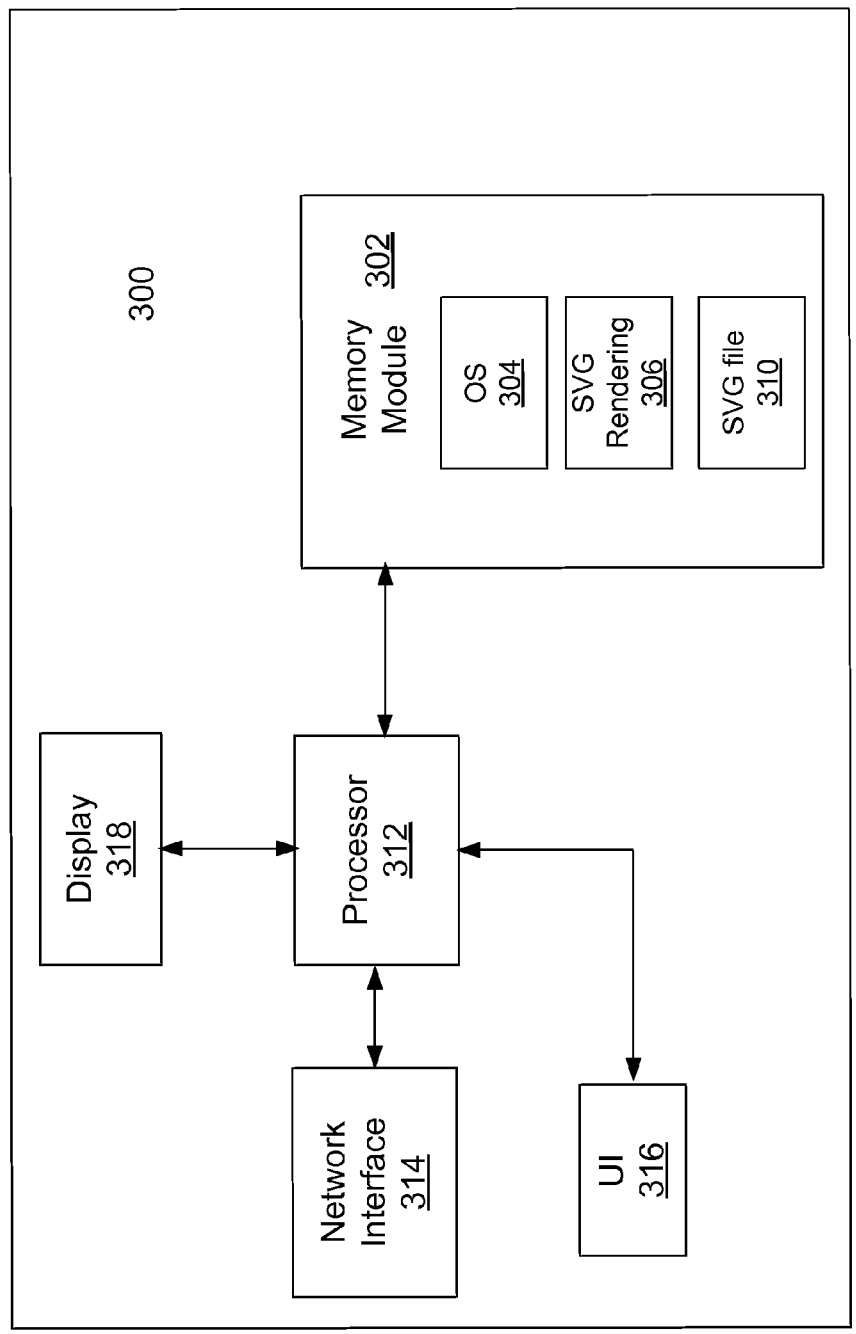
FIG. 3 is a block diagram of a mobile device system 300 for implementing example embodiments.

FIG. 3 is a block diagram of a mobile device system 300 for implementing example embodiments. The mobile device system 300 includes a memory module 302 storing data and program code. In this example, the memory module 302 stores the device operating system 304, for example iOS or Android, an SVG client-side rendering application 306, and data 310 such as a high-resolution SVG file to be rendered.

The SVG client-side rendering application 306 includes computer code for performing client-side dynamic reduction of vector maps as described above.

A processor 312 is coupled to the memory module 302, a network interface 314, a user interface (UI) 316 and a display 318. The processor 312 may comprise multiple processing units including a graphics processor.

In an example embodiment, the SVG rendering client-side application 306 may be created using the Oracle Development Framework Mobile (ADF Mobile) developed by the assignee of the present application, which enables developers to build and extend enterprise applications for iOS and Android from a single code base. Mobile ADF supports access to native device services and enables offline applications.

In an example embodiment, the server client model allows storing a single high-resolution vector map image on the server. When the high resolution vector map is downloaded to a client, client side scaling software calculates a scale factor and, if the scale factor is less than one, creates simplified vector commands for rendering on the low resolution viewport. Accordingly, multiple versions of the vector map intended for clients having viewports of different resolution need not be stored on the server thus simplifying the server-side map creation process.

Figure 4:
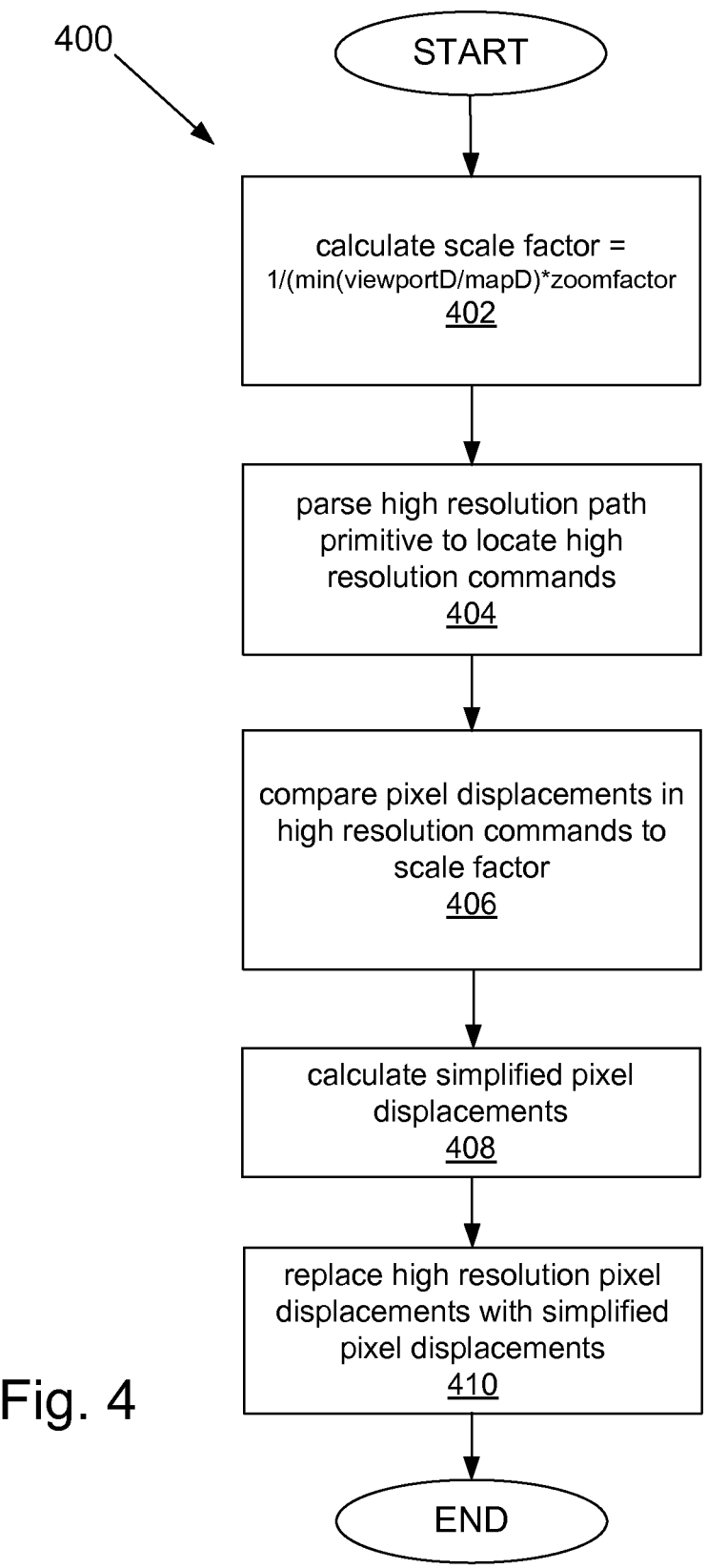
FIG. 4 is a flow chart 400 illustrating an example process of dynamically simplifying vector coordinate precision.

FIG. 4 is a flow chart 400 illustrating an example process of dynamically simplifying vector coordinate precision. In this example, locations in the image component space are referenced to a coordinate system.

In process step 402 the scale factor is calculated based on the dimensions of the base map, the viewport and the zoom factor.

In process step 404 a high resolution path primitive is parsed to locate commands in the path primitive.

In process step 406 a located command is parsed and high resolution pixel displacements specified by pixel coordinates in the command are compared to the scale factor.

In process step 408 simplified pixel displacements are calculated by accumulating non-resolvable high-resolution pixel displacements until the value of an accumulated pixel displacement is greater that the scale factor.

In process step 410 accumulated high resolution pixel coordinates are replaced by simplified pixel coordinates that specify the accumulated displacement to create a simplified path primitive.

The creation of simplified commands at the client device allows user interactions, such as panning and zooming, to appear faster and smoother to the user thereby enhancing the user experience. The image appears the same as it would have if the high resolution vector commands had been rendered because the high resolution details of the image would not have been visible in the low resolution viewport. Accordingly, no visual information is lost at the client as a result of simplifying the vector image commands.

In an example embodiment, the mobile device system 300 is part of a computer system. In the following a computer system may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

The following is pseudo-code listing the process steps of the example of FIG. 4 in greater detail.

TABLE 1

```
// This algorithm takes a list path drawing commands for map areas
(paths)
and given the actual width (basemapW) and height (basemapH) of the
map,
// the viewport width (viewportW) and height (viewportH), and how man
times we want to allow zooming in from the scaled version that fits in the
viewport (zoomFactor),
// will reduce the path commands for each map area in the list. We assume
here that zooming is allowed so that zoomFactor > 0
var dzx = viewportW/basemapW;
var dzy = viewportH/basemapH;
var dz = Math.min(dzx, dzy);
var scale = 1/(dz*zoomFactor);
if (scale <= 1)
    return paths;
// If scale = 10 that means 10 pixels in the map coordinate space = 1
pixel in the current viewport
// and any draw commands less than 10 pixels in the map coordinate
space
won't even show up in the viewport
var simplifiedPaths = [ ];
for (var path in paths) {
    // We assume that cmdAr is an array of relative path commands in
this example, but this algorithm can be extended for absolute commands
as
well, ex: [M, 6, 14, 1, 6, 12, 9, 12, ...]
    // In this example we will go thru the cmdAr array and return a String
representing the new simplified path command
    // Note that this example is using SVG path commands and that not
all valid path commands are currently being handled here.
    // Also, the extra simplification of converting multiple line to
commands to horizontal and vertical line to commands is being done
where possible in this example.
```

TABLE 1-continued

```
    var cmdAr = paths[path];
    var cmd;
    var simplifiedCmdStr = '';
    var partialX = 0;
    var partialY = 0;
    var simplifiedCmd;
    for (var i=0; i<cmdAr.length; i++) {
        if (isNaN(cmdAr[i])) {
            cmd = cmdAr[i];
            if(cmd = 'Z' || cmd=='z'){
                simplifiedCmd = cmd;
                simplifiedCmdStr += cmd;
                partialX = 0;
                partialY = 0;
            }
            continue;
        }
        switch (cmd) {
            case 'M':
                partialX = 0;
                partialY = 0;
            case 'm':
                simplifiedCmdStr = simplifiedCmdStr + cmd +
                    cmdAr[i]+ " " +cmdAr[i+1];
                simplifiedCmd = cmd;
                i++;
                break;
            case 'l':
                partialX += cmdAr[i];
                partial Y += cmdAr[i+1];
                if (Math.abs(xMove) > scale || Math.abs(yMove) >
scale) {
                    if (simplifiedCmd != cmd) {
                        simplifiedCmd = cmd;
                        simplifiedCmdStr += cmd;
                    } else {
                        simplifiedCmdStr += ' ';
                    }
                    simplifiedCmdStr = simplifiedCmdStr +
                        partialX + " " + partialY;
                    partialX = 0;
                    partialY = 0;
                }
                i++;
                break;
            case 'h':
            case 'v':
                if (cmd == 'h')
                    partialX += cmdAr[i];
                else
                    partialY += cmdAr[i];
                if (Math.abs(xMove) > scale || Math.abs(yMove) >
scale) {
                    if (partialX != 0 && partialY != 0) {
                        if (simplifiedCmd != 'l') {
                            simplifiedCmd = 'l';
                            simplifiedCmdStr += 'l';
                        } else {
                            simplifiedCmdStr += ' ';
                        }
                        simplifiedCmdStr = simplifiedCmdStr +
                            partialX + " " + partialY;
                    } else {
                        simplifiedCmd = cmd;
                        simplifiedCmdStr = simplifiedCmdStr +
                            cmd + (cmd == 'h' ? partialX : partialY);
                    }
                    partialX = 0;
                    partialY = 0;
                }
                break;
            default:
        }
    }
    simplifiedPaths[path] = simplifiedCmdStr;
}
return simplifiedPaths;
```

Figure 5:
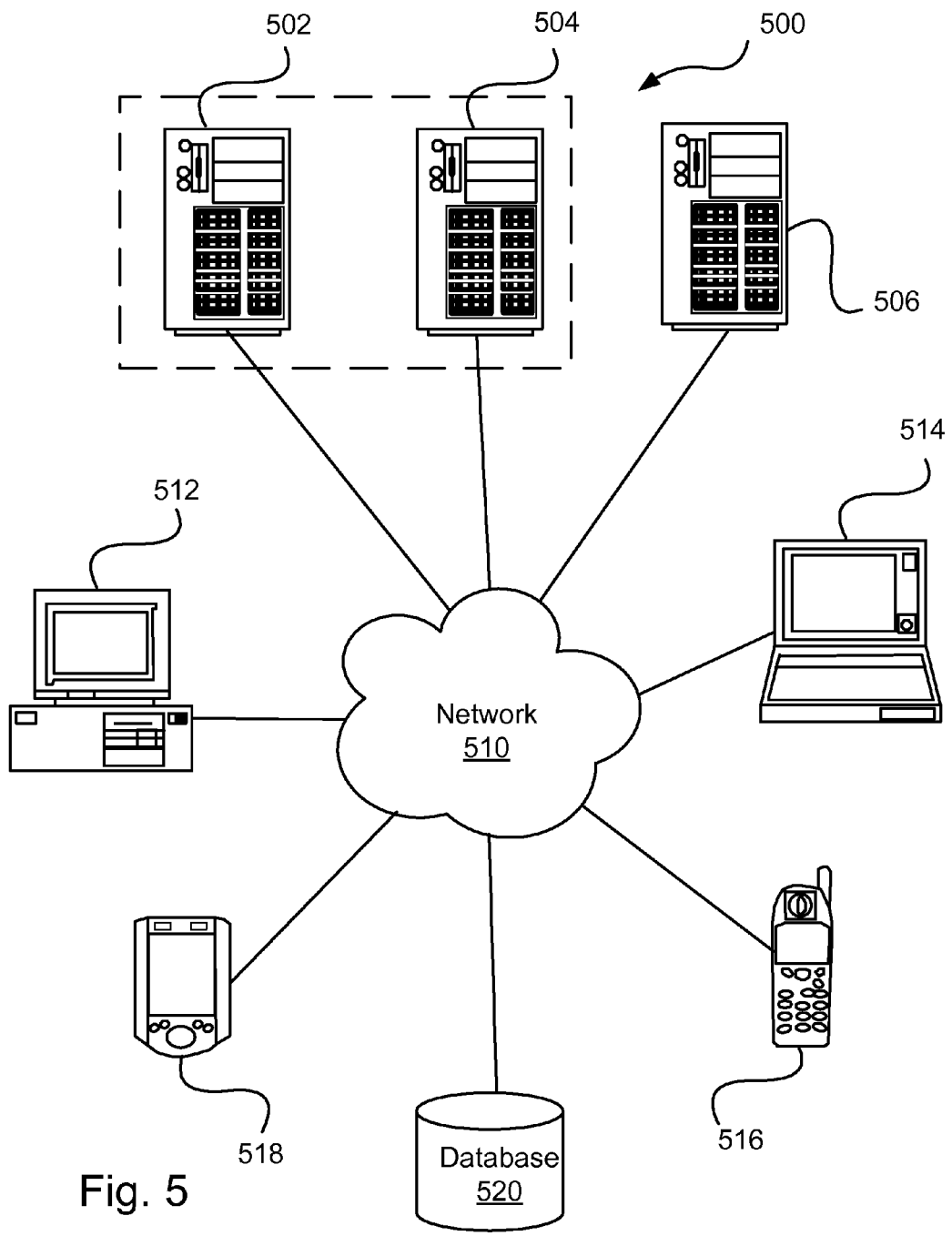
FIG. 5 is a block diagram illustrating components of an example operating environment in which various embodiments of the present invention may be implemented.

FIG. 5 is a block diagram illustrating components of an example operating environment in which various embodiments of the present invention may be implemented. The system 500 can include one or more user computers, computing devices, or processing devices 512, 514, 516, 518, which can be used to operate a client, such as a dedicated application, web browser, etc. The user computers 512, 514, 516, 518 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of applications, including one or more development systems, database client and/or server applications, and Web browser applications. Alternatively, the user computers 512, 514, 516, 518 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the example system 500 is shown with four user computers, any number of user computers may be supported.

In most embodiments, the system 500 includes some type of network 510. The network may be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 502, 504, 506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 506) may be dedicated to running applications, such as a business application, a Web server, application server, etc. Such servers may be used to process requests from user computers 512, 514, 516, 518. The applications can also include any number of applications for controlling access to resources of the servers 502, 504, 506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 512, 514, 516, 518. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 512, 514, 516, 518.

The system 500 may also include one or more databases 520. The database(s) 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via the network 510) with one or more of these. In a particular set of embodiments, the database 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, the database 520 may be a relational database, such as Oracle 10g, that is adapted to store, update, and retrieve data in response to SQL-formatted commands.

Figure 6:
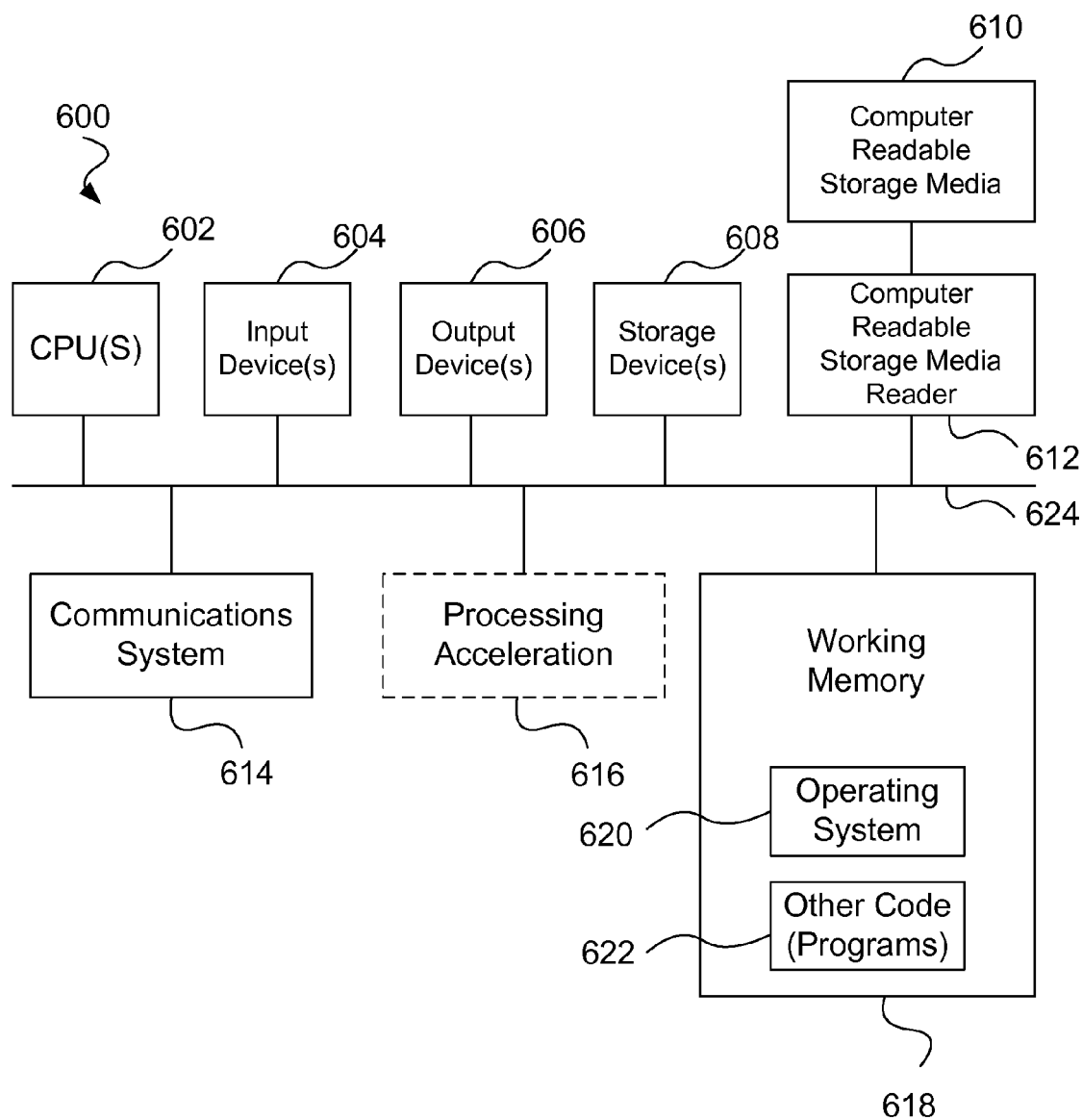
FIG. 6 illustrates an example computer system in which various embodiments of the present invention may be implemented.

FIG. 6 illustrates an example computer system 600, in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage devices such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Although the description has been described with respect to particular embodiments thereof, these particular embodiments are merely illustrative, and not restrictive. For example, zooming operations have been described above but the principles described may be applied to other transformations when the viewport size is changed. Further, various types of controls, such a slider, buttons etc., may be used to initiate and control zooming operations.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices and field programmable gate arrays. Optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine readable medium to permit a computer to perform any of the methods described above.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material within the essential scope and spirit.

We claim:

1. A method, performed by a computer system, for dynamically reducing precision of a high precision vector graphics command to create a corresponding simplified vector graphics command, the method comprising:
    calculating, by the computer system, a scale factor indicating a minimum number of pixels of a high precision vector data image that can be resolved on a low resolution view port;
    parsing, by the computer system, a path command to locate a first set of relative pixel coordinates in a first high precision vector graphics command;
    comparing, by the computer system, the absolute values of each relative pixel coordinate in the first set of relative pixel coordinates to the scale factor to determine whether the absolute value is greater than the scale factor; and
    reducing, by the computer system, the absolute value of a relative pixel coordinate only if the absolute value is greater than the scale factor to create the simplified vector graphics command.

2. The method of claim 1 where calculating a scale factor comprises:
    calculating a ratio of a view port dimension to a full image dimension where the view port dimension indicates the number of pixels rendered in a low resolution view port and the full image dimension indicates the number of pixels rendered in a high resolution display image; and
    setting the scale value to the inverse of the ratio.

3. The method of claim 2 further comprising:
    setting the view port dimension equal to a minimum of a viewport width value or a view port height value.

4. The method of claim 2 where calculating the scale factor further comprises:
    multiplying the scale value by the reciprocal of a zoom factor.

5. The method of claim 2 where a zoom factor is the ratio of a number of pixels in an original viewport to a number of pixels in a zoomed viewport.

6. The method of claim 1 where the first high precision command is a Scalar Vector Graphics (SVG) command and first set of coordinates are x and y coordinates.

7. The method of claim 1 further comprising:
    rendering the simplified vector graphics command as a vector graphic visualization on the low resolution view port.

8. An apparatus for dynamically reducing precision of a high precision vector graphics command to create a corresponding simplified vector graphics command, the apparatus comprising:
   one or more processors;
   a display coupled to the one or more processors; and
   logic encoded in one or more non-transitory computer readable media for execution by the one or more processors and with the one or more processors, when executing the logic, performing the acts of:
   calculating a scale factor indicating a minimum number of pixels of a high precision vector data image that can be resolved on a low resolution view port;
   parsing a path command to locate a first set of relative pixel coordinates in a first high precision vector graphics command;
   comparing the absolute values of each relative pixel coordinate in the first set of relative pixel coordinates to the scale factor to determine whether the absolute value is greater than the scale factor; and
   reducing the absolute value of a relative pixel coordinate only if the absolute value is greater than the scale factor to create the simplified vector graphics command.

9. The apparatus of claim 8 where calculating a scale factor comprises:
   calculating a ratio of a view port dimension to a full image dimension where the view port dimension indicates the number of pixels rendered in a low resolution view port and the full image dimension indicates the number of pixels rendered in a high resolution display image; and
   setting the scale value to the inverse of the ratio.

10. The apparatus of claim 9 further comprising:
   setting the view port dimension equal to a minimum of a viewport width value or a view port height value.

11. The apparatus of claim 9 where calculating the scale factor further comprises:
   multiplying the scale value by the reciprocal of a zoom factor.

12. The apparatus of claim 9 where the zoom factor is the ratio of a number of pixels in an original viewport to a number of pixels in a zoomed viewport.

13. The apparatus of claim 8 where the first high precision command is a Scalar Vector Graphics (SVG) command and first set of coordinates are x and y coordinates.

14. The apparatus of claim 8 further comprising:
   rendering the simplified vector graphics command as a vector graphic visualization on the low resolution view port.

15. A non-transitory computer readable storage medium comprising encoded program code for execution by one or more computer processors on a computer to dynamically reduce precision of a high precision vector graphics command to create a corresponding simplified vector graphics command, where the program code when executed is executable to perform the acts of:
   calculating a scale factor indicating a minimum number of pixels of a high precision vector data image that can be resolved on a low resolution view port;
   parsing a path command to locate a first set of relative pixel coordinates in a first high precision vector graphics command;
   comparing the absolute values of each relative pixel coordinate in the first set of relative pixel coordinates to the scale factor to determine whether the absolute value is greater than the scale factor; and
   reducing the absolute value of a relative pixel coordinate only if the absolute value is greater than the scale factor to create the simplified vector graphics command.

16. The non-transitory computer-readable storage medium of claim 15 where calculating a scale factor comprises:
   calculating a ratio of a view port dimension to a full image dimension where the view port dimension indicates the number of pixels rendered in a low resolution view port and the full image dimension indicates the number of pixels rendered in a high resolution display image; and
   setting the scale value to the inverse of the ratio.

17. The non-transitory computer-readable storage medium of claim 16 further comprising:
   setting the view port dimension equal to a minimum of a viewport width value or a view port height value.

18. The non-transitory computer-readable storage medium of claim 16 where calculating the scale factor further comprises:
   multiplying the scale value by the reciprocal of a zoom factor.

19. The non-transitory computer-readable storage medium of claim 16 where the zoom factor is the ratio of a number of pixels in an original viewport to a number of pixels in a zoomed viewport.

20. The non-transitory computer-readable storage medium of claim 15 further comprising:
   rendering the simplified vector graphics command as a vector graphic visualization on the low resolution view port.

* * * * *

UNITED STATES PATENT AND TRADEMARK OFFICE
CERTIFICATE OF CORRECTION

PATENT NO.        : 9,501,812 B2
APPLICATION NO.   : 14/033355
DATED             : November 22, 2016
INVENTOR(S)       : Dai et al.

Page 1 of 1

It is certified that error appears in the above-identified patent and that said Letters Patent is hereby corrected as shown below:

In the Drawings

On sheet 2 of 6, in Fig. 2, Line 2, delete "2C" and insert -- 204 --, therefor.

In the Specification

In Column 4, Line 5, delete "'1'" and insert -- '1' --, therefor.

In Column 4, Line 27, delete "'1'" and insert -- '1' --, therefor.

In Column 4, Line 29, delete ""1"" and insert -- "l" --, therefor.

In Column 5, Line 43, delete "man" and insert -- many --, therefor.

In Column 5, Line 60, delete "1," and insert -- 1, --, therefor.

In Column 6, Line 10, delete "if(cmd = 'Z' || cmd= ='z'){" and insert -- if(cmd== 'Z' || cmd=='z'){ --, therefor.

In Column 6, Line 26, delete "partial Y" and insert -- partialY --, therefor.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*